US006457242B1

(12) United States Patent
Fogle

(10) Patent No.: US 6,457,242 B1
(45) Date of Patent: Oct. 1, 2002

(54) AUTO-LOADING FIXED-LINE TRIMMER HEAD

(75) Inventor: John R. Fogle, Cave Creek, AZ (US)

(73) Assignee: Robert L. Phillips, Scottsdale, AZ (US); a part interest ( * ) Notice: Subject to any disclaimer, the term of this patent is extended or adjusted under 35 U.S.C. 154(b) by 0 days.

(21) Appl. No.: 09/952,544

(22) Filed: Sep. 14, 2001

(51) Int. Cl.7 .............................................. A01D 34/67
(52) U.S. Cl. .......................................... 30/347; 30/276
(58) Field of Search ................... 30/276, 347; 56/12.7, 56/12.5, 255, 295; 172/13

(56) References Cited

U.S. PATENT DOCUMENTS

| | | | | |
|---|---|---|---|---|
| 4,043,103 A | * | 8/1977 | Lakin et al. ............... | 30/276 X |
| 4,756,146 A | | 7/1988 | Rouse ....................... | 30/276 X |
| 5,197,264 A | * | 3/1993 | Lacey ....................... | 30/276 X |
| 5,398,416 A | * | 3/1995 | Mackey ..................... | 30/347 |
| 5,836,227 A | * | 11/1998 | Dees et al. ................. | 30/276 |
| 5,901,448 A | * | 5/1999 | Lingerfelt .................. | 30/276 |
| 6,052,974 A | * | 4/2000 | Harb ........................ | 30/276 X |
| 6,158,129 A | * | 12/2000 | Klein ....................... | 30/276 |

* cited by examiner

Primary Examiner—Douglas D. Watts
(74) Attorney, Agent, or Firm—LaValle D. Ptak

(57) ABSTRACT

A trimmer head for string trimmer machines using fixed length segments of line is made to accommodate trimmer line in a range of different sizes, from relatively small diameter line to relatively large diameter line. To accomplish this, the trimmer head consists of a generally cylindrically shaped hollow main housing having a central axis through it. Exit openings for the line are formed on diametrically opposite sides of the main housing; and line entry holes in two different pairs or sets are formed through the housing. An insert member is placed on the interior of the housing and the insert member has first and second guide channels aligned with and operating with the line entry holes and exit openings to guide string trimmer line inserted through a line entry hole in an arcuate path to exit from the corresponding line exit openings without separately threading the line into the line exit openings.

25 Claims, 4 Drawing Sheets

AUTO-LOADING FIXED-LINE TRIMMER HEAD

BACKGROUND

Weed and grass trimmers have been developed which employ a rotatable hub with a short length of flexible nylon or other plastic line extending from the hub. When the hub is rotated (typically at speeds from 6,000 RPM to 12,000 RPM), the tip of the line extending from the hub provides the cutting or trimming action. Grass and weed trimmers using this principle of operation have become popular for their versatility of use, and because the flexible trim line is safer to use than rigid rotating steel blades.

Various types of devices have been developed for using such trim lines. Typically, rotating line trimmers or rotating string trimmers employ a trimmer line which generally has a circular cross section. The line, in many trimmers, is wound on a storage reel in the hub of the device, and is fed out of a hole or a plurality of holes in the hub in discrete amounts, as the end breaks off or wears off. Trimmers of this type sometimes are referred to as "bump-and-feed" trimmers. When the line breaks off, the bottom of the storage reel is bumped on the ground while the hub continues rotating to cause a spring release of the line within the trimmer. A short length of line then plays out through a hole in the hub by means of centrifugal force. Typically, the smaller (2½ inch diameter to 3½ inch diameter) head bump-and-feed string trimmers use relatively small diameter line, normally in the rang of 0.65" to 0.080" diameter, since the smaller diameter flexible line functions better for the centrifugal feeding of such smaller diameter bump-and-feed heads.

The reason that small diameter line is used in bump-and-feed string trimmers is that heavier diameter line (for example, 0.115" to 0.160" diameter) typically is too stiff for winding and for the centrifugal feeding used in bump-and-feed heads. Commercial bump-and-feed heads use a larger diameter head than those designed for home use, and operate with somewhat larger diameter flexible line, generally from 0.95" to 0.105" diameter. These commercial heads normally have a larger capacity for such line, so that less frequent reloading of the line is required.

A problem exists with all bump-and-feed trimmers, however, in that frequently the line which is wound on the storage reel in the hub tends to become stuck, either due to partial fusion of the line in the hub, caused by high frequency vibration, or by successive turns of the line wound on the hub becoming somewhat entangled. As a result, feeding of the line from the hub, when desired, does not always take place. When this occurs, it is necessary to remove the hub from the string trimmer device and manually extract the desired length of line prior to re-attaching the hub of the device. This is a time consuming and frustrating experience for many users of flexible line string trimmers. It is particularly frustrating for professional landscapers because of the relatively significant amount of lost time required to remove the hub, extract the line, and re-attach the hub before operation can resume.

For commercial use employing relatively large diameter lines, for example 0.115" to 0.160" diameter, fixed line or fixed length line trimmer heads usually are employed. Large diameter monofilament nylon lines are particularly useful where weed and grass growth is dense. The large diameter lines also provide longer length of service before the line needs to be replaced. Due to the hole design and pattern, smaller standard sized lines (under about 0.095" diameter) have a tendency to slip out of commercial fixed heads during operation.

One type of fixed line trimmer head for commercial use is the Echo® heavy duty fixed line trimmer head, stock No. 999442-0020. This trimmer head is designed to replace a saw blade trimmer/brush cutter, or other types of flexible line trimmer heads. The Echo® trimmer head is open on its underside, and provides serpentine paths for the insertion of two fixed lengths of 0.130" diameter monofilament line. The line is inserted between closely spaced, offset guide surfaces to hold it in place during operation. When a new length of line needs to be inserted, the old line must be removed; and the new line then is guided into place around the guide surfaces. Because the guide surfaces are close together and because 0.130" diameter line is relatively stiff, it is difficult to install and remove sections of nylon line from the Echo® trimmer head. This difficulty results in excessive time being consumed for the removal and replacement of line segments.

Another fixed-line trimmer head is known as the Grass Terminator® replacement head, designed for replacing the bump-and-feed spool cartridges of a variety of line trimmer machines designed for home use. The Grass Terminator® fixed head also employs guide paths for feeding two segments of line into and out of the head. The guide paths used with this head, in some cases, tend to allow the line to be pulled out of the head when it strikes an obstruction, such as a chain link fence or the like, particularly when the small diameter trim lines for which the head is designed are used.

The United States patent to Rouse U.S. Pat. No. 4,756,146 discloses a head for a string trimmer machine in which a pair of enclosed guide tunnels are formed in the head to guide a segment of string trimmer line from an entry hole to an exit hole. These tunnels are located with one end of each tunnel located near a corresponding one of a pair of relatively closely spaced entry holes, and the exit ends of the tunnels are located at a greater distance around the periphery of the trimmer head to allow exiting of the inserted line from the head. A problem which exists with this construction, however, is that the tunnels are configured to accommodate the particular size of line which is to be used with the trimmer, and because of the relatively low clearance provided by the inside diameter of the tunnel, it is possible for the tunnels to become clogged, or for difficulty to be encountered with the insertion of the line into the head.

The United States patent to Fogle U.S. Pat. No. 6,035,618 is a fixed-line trimmer head which overcomes the disadvantages of the prior art devices discussed above. The fixed line trimmer head of Fogle employs a pattern of pairs of entry and exit holes for inserting a fixed length of trimmer line through a pair of relatively closely spaced entry holes, and then extending each end of the line out through exit holes located in the head. The entry holes and exit holes are offset from one another in different planes perpendicular to the axis of the trimmer head, and securely hold the line in place during use of the trimmer. It is relatively easy to remove an expended section of line and replace it with a new section of line when necessary. The fixed line trimmer head of the Fogle '618 patent, however, does require the user to manually to insert the opposite lengths of the line through the two entry holes, and then again manually insert each of the line segments into the exit holes in the head whenever a line replacement is required. The Fogle patent also discloses utilization of sets of entry holes of different diameters to allow the use of segments of trimmer line having different diameters, as desired, in the same head. Even though the device of the Fogle patent is a significant improvement over the bump-and-feed trimmers and over the fixed line trimmers discussed above, it still is necessary to manually insert the ends of a line through separate entry and exit holes for each length of the line. This requires the user to have access to the bottom of the hollow trimmer head in order to extend the ends of the line into the exit holes for use.

Accordingly, it is an object of this invention to provide an improved fixed line trimmer head for string trimmer machines, which overcomes the disadvantages of the prior art, which may be used as an alternative to bump-and-feed trimmer cartridges, which is easier to load than the devices of the prior art, and which securely holds fixed segments of line of different sizes in place during use.

SUMMARY OF THE INVENTION

Accordingly, it is an object of this invention to provide an improved trimmer head for string trimmer machines.

It is another object of this invention to provide an improved trimmer head for string trimmer machines using fixed length segments of trimmer line.

It is an additional object of this invention to provide an improved trimmer head for string trimmer machines using fixed lengths of trimmer line in which the line is simple to install and replace.

It is yet another object of this invention to provide an improved trimmer head for string trimmer machines utilizing fixed length segments of line and which is capable of use with line segments varying over a relatively wide range in diameter.

It is yet an additional object of this invention to provide an improved trimmer head for string trimmer machines utilizing fixed length segments of trimmer line which may be loaded simply by pushing the line through entry holes in the trimmer head.

It is a further object of this invention to provide a trimmer head for string trimmer machines utilizing fixed lengths of trimmer line which is easy to load, and which employs a pattern of entry and exit holes designed to firmly hold the line in place during use, and to facilitate rapid removal and replacement of the line as needed.

In accordance with a preferred embodiment of the invention, a trimmer head for string trimmer machines utilizing fixed length segments of line employs a generally cylindrically shaped, hollow main housing member having a central axis and configured at a first end for attachment to the drive shaft of a string trimmer machine. The hollow main housing member is open at a second end. First and second string entry holes are formed through the main housing member; and these entry holes are spaced a first predetermined distance apart. First and second string exit openings also are formed through the main housing member, with the first exit opening spaced a predetermined second distance from the first entry hole and the second exit opening spaced a third predetermined distance from the second entry hole; so that the distance between the first and second string exit openings is greater than the first predetermined distance between the first and second string entry holes. To facilitate loading of a segment of string trimmer line into the main housing member, an insert plug is placed in the hollow interior of the main housing member; and first and second arcuate guide channels are located between the first entry hole and the first exit opening, and the second exit hole and the second exit opening, respectively. The channels are configured to guide the end of a line inserted through the first or second entry hole to the first and second exit openings, respectively, as the line is pushed through the first and second entry holes to load the line into the trimmer head. The channels in the insert are open channels extending from the outer surface of the insert to the arcuate path.

DETAILED DESCRIPTION

Figure 1:
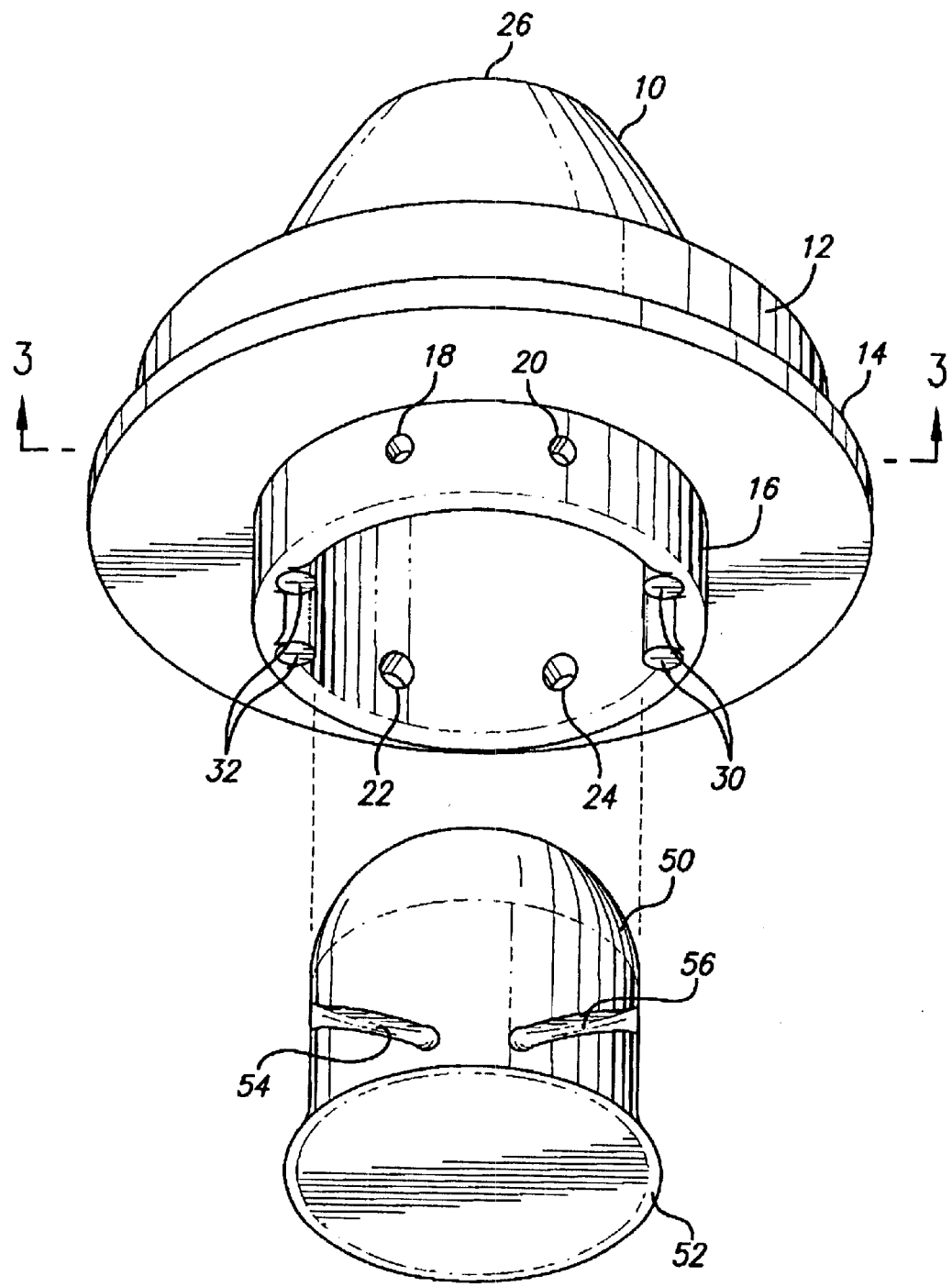
FIG. 1 is a bottom exploded perspective view of a preferred embodiment of the invention.

Reference now should be made to the drawings, in which the same reference numbers are used throughout the different figures to represent the same components. FIG. 1 is a bottom exploded perspective view of a preferred embodiment of the invention designed to be attached to the end of the operating shaft of a string trimmer machine. As disclosed in FIG. 1, the trimmer head for utilizing fixed length segments of trimmer line comprises a central cylindrically shaped hollow main housing 10 (preferably made of aluminum), with a circular flange 12 located above a larger circular flange 14 intermediate its length. The lower end of the housing 10 comprises a circular cylindrical portion 16; and this end is open, as is readily apparent from an examination particularly of FIGS. 1 and 3.

Figure 3:
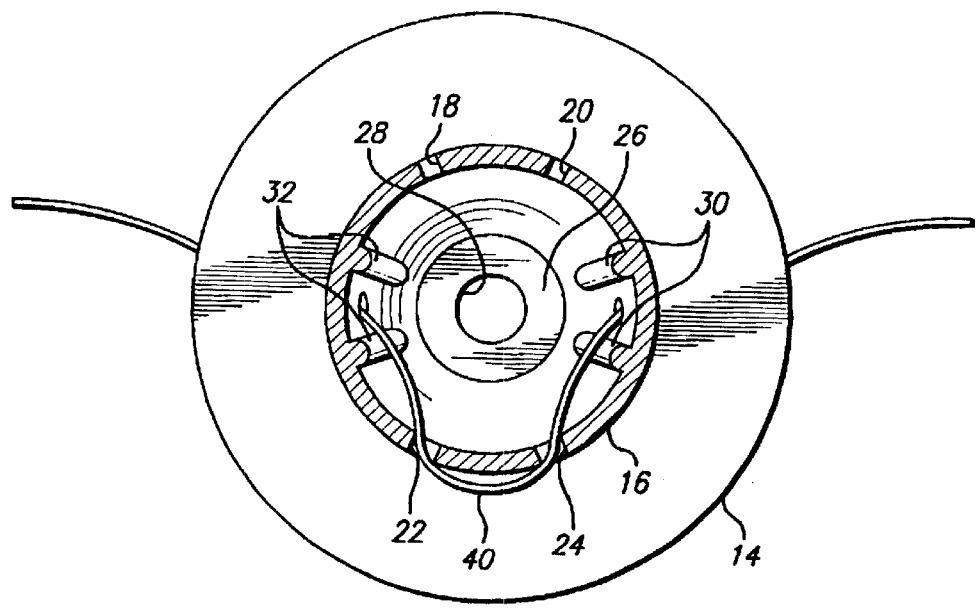
FIG. 3 is a cross-sectional view taken along the line 3—3 in FIG. 2.

The top 26 of the main housing 10 is flat; and it has a circular hole or aperture 28 through it, as shown most clearly in FIG. 3. The hole 28 is used to accommodate the drive shaft of a string trimmer machine (not shown), which then is secured to the housing 10, 12, 14, 16 by means of a nut or bolt (depending upon the design of the machine). Since this attachment is a standard attachment, it is not shown in any of the drawings. A variety of different devices and techniques for attaching the main housing 10/12/14/16 may be used to accommodate the fixed line head of FIG. 1 to machines of different designs.

Also as shown in FIGS. 1, 2, 3 and 4, the lower cylindrical portion 16 of the main housing includes two diametrically opposed pairs of string trimmer line entry holes 18/20 and 22/24. Each of these pairs of holes are drilled through or formed through the portion 16 in a direction extending radially from the central axis of the various portions of the main housing 10/12/14/16. This is shown most clearly in FIGS. 3 and 4. Also as shown most clearly in FIGS. 3 and 4, the hole sets or pairs 18/20 and 22/24 are located a relatively short distance apart to accommodate a bight in a segment of string trimmer line 40. The holes 18 and 20 are smaller in diameter than the hole pair 22 and 24 to allow use of the fixed line head shown in FIG. 1 with segments of trimmer line of relatively small diameters (for the entry holes 18 and 20), or relatively large diameter (for the entry holes 22 and 24).

Typically, the fixed line trimmer head shown in FIG. 1 of the drawings (and in the alternative embodiment of FIG. 2) is used to replace a bump-and-feed cartridge generally employed with string trimmer machines. When the trimmer head shown in either FIG. 1 or FIG. 2 of the drawings is attached in place, it is rotated at the speed of rotation of the drive shaft of the string trimmer machine (not shown) to which it is attached. This speed of rotation for typical string trimmer machines ranges from a low of 6,000 RPM to a high of approximately 12,000 RPM. A typical operating speed is on the order of 8,000 RPM. Various factors can cause this speed to vary with any given machine, depending upon the length of line used, the diameter of the line, and the number of line ends extending from the rotating head.

For a commercial embodiment of the head shown in FIGS. 1 through 7, the outside diameter of the portion 16 is approximately 2⅛"; and the wall thickness of the portion 16 is approximately ¼". The outside diameter of the flange 14 is 4"; and the overall height of the housing 10/12/14/16, from the top 26 to the open bottom of the cylindrical portion 16, is approximately 2". These dimensions are typical of a head designed for use with a large number of different string trimmer machines manufactured by a variety of manufacturers for the home use market. Clearly, the dimensions of the trimmer head shown in the drawings may be varied in accordance with particular machines designed for different uses, as desired.

Figure 4:
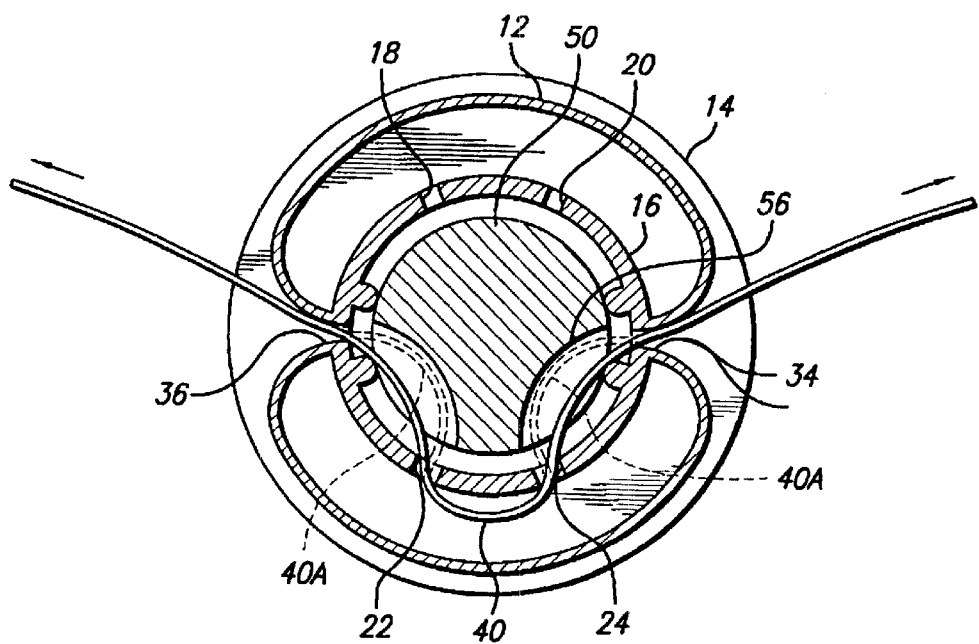
FIG. 4 is a composite cross-sectional view of an assembly of the type shown in FIG. 1 illustrating the line path configuration of the embodiment of FIG. 1.

As shown most clearly in FIGS. 3 and 4, the main housing has a pair of diametrically opposed (180°) string exit openings 34 and 36 formed through the portion 12 above the flange 14. This location is shown in the bottom cross-sectional view of FIG. 3, and in the modified bottom/intermediate composite cross-sectional view of FIG. 4. This general configuration of the main housing, which has been described thus far, is comparable to the structure of the fixed line trimmer head of the patent to Fogle U.S. Pat. No. 6,035,618 mentioned previously. With nothing more, the use and operation of the string trimmer head portion 10/12/14/16 by itself could be the same as described in the Fogle U.S. Pat. No. 6,035,618.

In the device shown in FIG. 1, however, an additional component, in the form of an internal plug or core 50, is provided. The core 50 is inserted into the main housing 10/12/14/16 after the main housing is attached to the drive shaft of a string trimmer machine, as described previously. The core 50 includes two arcuate slots or channels 54 and 56, which are shown most clearly in FIGS. 1 and 4. These channels have a curvature which extends from the entry hole pair, for example 22 and 24, to the exit hole pair 36 and 34, at an angle to guide a length of trimmer line, such as the length 40 shown in FIGS. 3 and 4, from the entry holes (22 and 24 or 18 and 20). This entry path for the line is indicated in dotted lines 40A in FIG. 4; so that when the bight of the center portion of a segment of trimmer line is inserted with one end through the entry hole 22 and the other end through the entry hole 24, the end of the line follows the path shown as 40A in FIG. 4, and is guided in the respective slot 54 or 56 to the corresponding exit opening 36 or 34. When the line 40 then is pulled tight to seat the bight securely between the holes 22 and 24, the line assumes the configuration or location shown in FIGS. 3 and 4, pulled against a corresponding adjacent longitudinal rib 30 or 32, again as shown most clearly in FIGS. 3 and 4. This is the operating configuration assumed by the line 40. It should be noted that the open arcuate channels 54 and 56 permit this change in orientation of the line; and the longitudinal ribs 30 and 32 further serve to secure the line 40 in place against accidental removal by an outward pulling force on either one of the free ends of the line 40 extending out of the exit openings 34 and 36.

Figure 2:
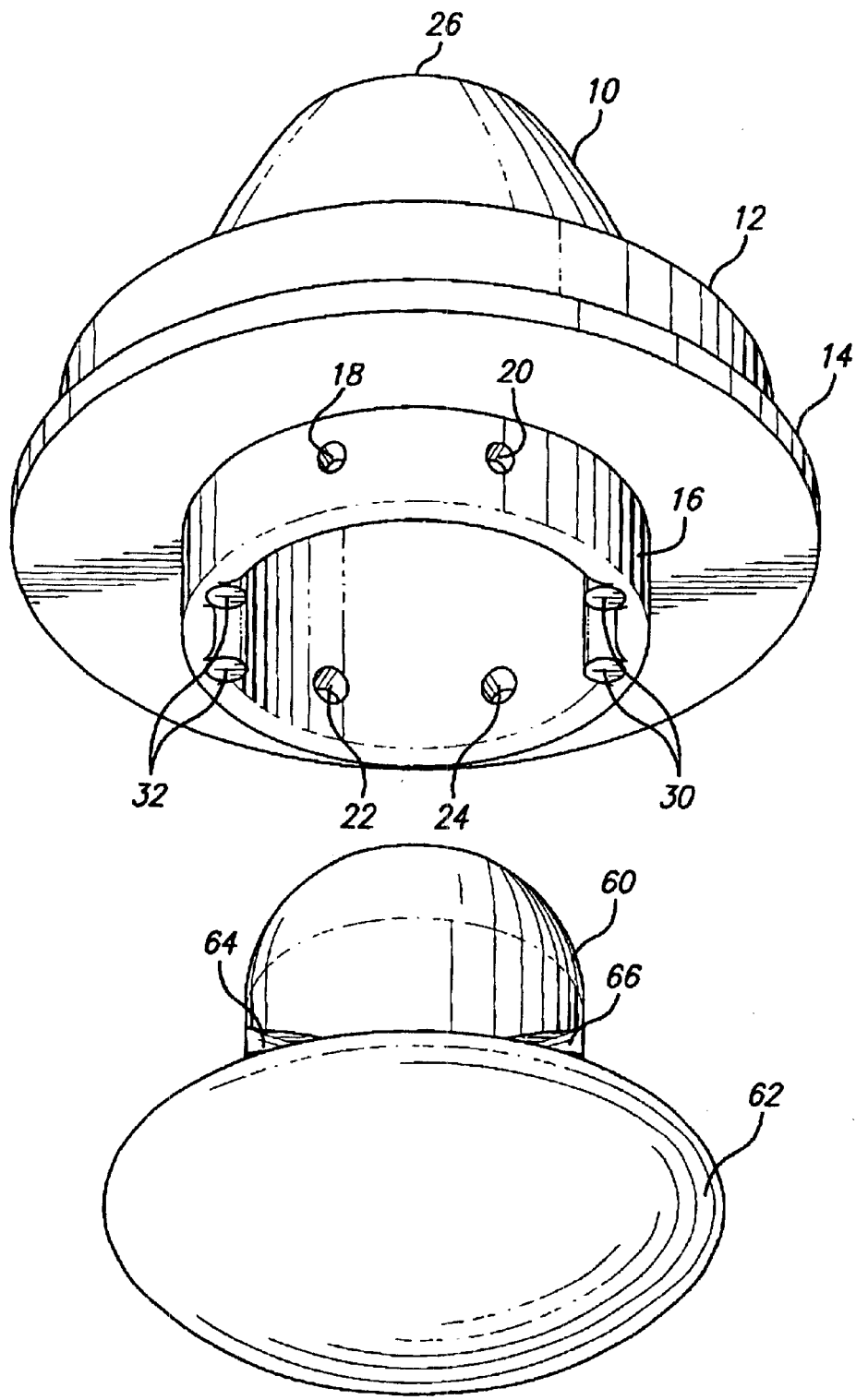
FIG. 2 is a bottom exploded perspective view of another embodiment of the invention.

As shown in FIG. 1, the lower end of the plug or insert 50 includes an enlarged flange 52, which is designed to overlie the bottom of the cylindrical portion 16 of the housing, with the outer diameter of the flange 52 being the same as the outer diameter of the portion 16. Thus, when the entire device is assembled in place, a flush assembly is provided. FIG. 2 shows an alternative arrangement of the insert plug which has been designated with the reference number 60 for the main body of the plug. Arcuate slots or channels 64 and 66 are formed in the body of the plug 60, and correspond in every way to the orientation and dimensions of the slots or channels 54 and 56 of the plug shown in FIG. 1. In the plug 60 of FIG. 2, however, the lower end includes an enlarged skid plate 62 in place of the relatively small flange 52; so that the plug itself serves as a combination guide for segments of string trimmer line and as a skid plate which may be replaced as it wears in the use of the device.

FIG. 3 illustrates, from the bottom, the path which is taken by a segment of string trimmer line 40 between a pair of entry holes (illustrated in FIG. 3 as the larger entry holes 22 and 24) and the exit openings 34 and 36. Without the plug 50 or 60, it would be necessary to separately insert the respective ends of the string segment 40 through each of the entry holes 22 and 24, and then again to separately insert the ends of the line segment into the exit openings 34 and 36. This is the type of operation which is employed in the fixed line trimmer head of the above mentioned U.S. Pat. No. 6,035,618.

When either of the plugs 50 or 60, however, is in place as illustrated in FIG. 4, the arcuate guide slots 54 or 56 (or 64/66) intercept the ends of the line 40 when it is inserted into the respective one of the holes 22 and 24 (or 18 and 20); and as the line is pushed into the hole 22 or 24 (or alternatively, 18 or 20), it follows the path shown in dotted lines as 40A from the entry hole 22 or 24 to the exit opening 36 or 34 without requiring the user to separately insert the line through the respective exit opening. This guiding of the line is effortless, since the curvature of the arcuate slots or channels 54 and 56 is selected to correspond to a natural curvature between the respective openings and 36 or 24 and 34, for example. The width of the channels 54 and 56 (or 64/66) is selected to be slightly greater than the diameter of the largest entry holes 22/24 and less than the diameter of the exit openings 34 and 36. As mentioned previously, when the ends of the line are pulled outwardly in the direction of the arrows shown in FIG. 4, the line pulls against the corresponding rib 30 or 32, as illustrated in both FIGS. 3 and 4, to assume the configuration or the orientation shown in both of these figures.

It should be noted, from an examination of FIGS. 1, 3, 4 and 7, that the entry holes 18, 20, or 22, 24 are located in a position near the open bottom of the cylindrical portion 16 of the main housing. This position is beneath the plane in which the exit openings 34 and 36 are located, causing an offset between the entry holes 18, 20 (or 22, 24) and the exit openings 34 and 36 to occur. This offset further ensures that the trimmer line which extends outwardly from the exit openings 34 and 36 does not slip, but is securely held in place. As noted previously, the entry holes 18, 20 and 22, 24 are formed radially through the housing (and are of a diameter which does not exceed about 1.8 times the external line diameter of the line inserted through them). Thus, the ends of the bight of the segment of the trimmer line 40 inserted through these pairs of entry holes exit toward the axis of the main housing, and then are guided at an acute angle outwardly to the diametrically opposed exit openings 34 and 36. The sets of entry holes 18, 20 or 22, 24 are located at an equal distance on either side of a line which is perpendicular to the projection of a line or plane passing through the openings 34 and 36 along the longitudinal direction of the axis of the main housing 10/12/14/16.

Consequently, with the line configured as shown in FIGS. 3 and 4, the trimmer line 40 is held firmly in place and does not slip, even when a significant pulling force is subjected to either of the outward extensions of the line 40 in an attempt to withdraw the line outwardly from the exit openings 34 or 36. When the line 40 is in place as shown in FIG. 4, it also serves to hold the insert 50 (or 60) in place against removal from the housing. In an actual embodiment of the invention which has been constructed in accordance with the dimensions given previously, the distance between the two holes of each of the entry hole sets 18, 20 and 22, 24 was selected to be one inch.

Even though the planes of the entry holes 18, 20 or 22, 24 and of the exit openings 34, 36 are offset from one another but parallel to one another, it should be noted that the guide plug system which is shown and described in conjunction with the preferred embodiment of the invention also may be used to accommodate entry holes and exit openings located in the same plane perpendicular to the central axis of the main housing 10/12/14/16.

Although the fixed line trimmer head which has been described above is illustrated as providing a single pair of oppositely oriented string trimmer line segments of a single segment of line 40 on opposite sides of the head, the two sets of entry holes 18, 20 and 22, 24 are provided for accommodating trimmer lines of different sizes, or different size ranges. For example, the holes 18, 20 are illustrated as being of a smaller diameter than the holes 22, 24. The holes 22, 24 typically are configured to accommodate line sizes of a maximum diameter, for example 0.160"; so that lines of this size may be used. On the other hand, the pair of entry holes 18, 20 are provided with a smaller internal diameter, for example of 0.080" to 0.090". The diameter of these smaller entry holes is too small to permit insertion of larger diameter size line, for example 0.130" to 0.160". If a smaller line diameter were to be inserted into the larger holes 22, 24, it is possible that the fit would be sufficiently loose that slippage of the line during operation could occur. By providing two sets of holes to accommodate lines in a relatively limited range of sizes, smaller sizes for the holes 18, 20 and larger sizes for the holes 22, 24, the fixed line trimmer head, which is shown and which has been described above, provides a wide range of flexibility for use. When the line is used with the entry holes 18 and 20, for example, the plug insert 50 (or 60) is simply rotated 180° from the position shown in FIG. 4. When this occurs, the guide path for the string trimmer line 40 is comparable to that which is shown in FIGS. 3 and 4, but extends from the entry hole pair 18 and 20 to the exit openings 34 and 36 instead of from the entry hole pair 22 and 24. Because of the cylindrical external dimensions of the plug 50 (or 60) and the cylindrical internal dimensions of the portion 16, this simple rotation from one set of entry holes to the other is easily effected.

It should be noted that once the main housing 10/12/14/16 is attached to the drive shaft of a string trimmer machine, the location of the insert plug 50 or 60 for the size line which is desired (or range of line sizes which are desired) is selected to cause either the entry hole pair 18 and 20 to be aligned with the slots or channels 54 and 56, or the holes 22 and 24 to be aligned with the slots or channels 54 and 56 (or alternatively, 64 and 66 for the embodiment of FIG. 2).

Figure 5:
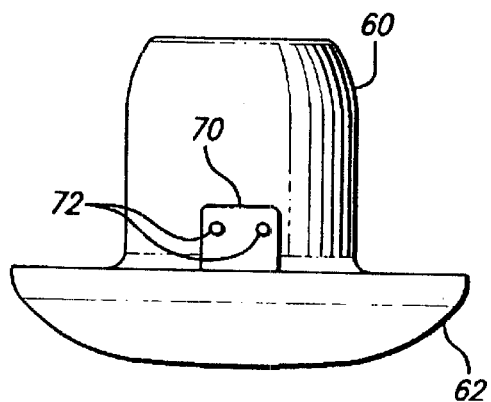
FIG. 5 is a side view of a portion of the embodiment of the invention shown in FIGS. 1 and 2.
Figure 6:
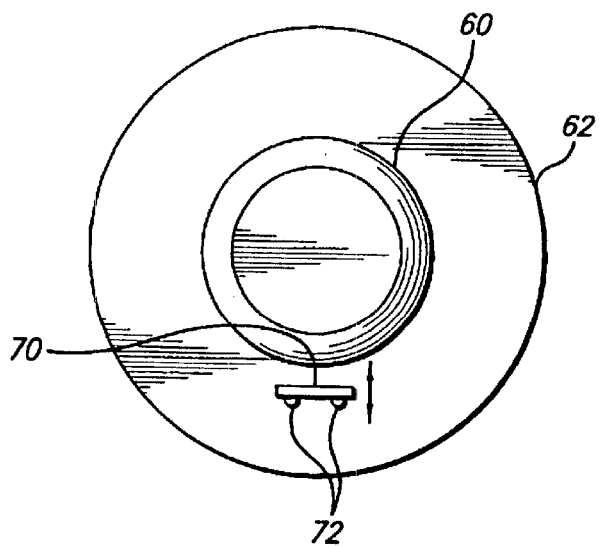
FIG. 6 is a top view of the portion shown in FIG. 5.
Figure 7:
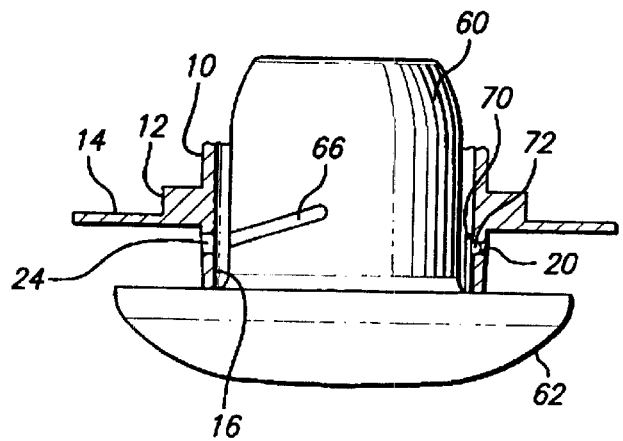
FIG. 7 is a partial side cross-sectional view of the assembly of FIG. 2 illustrating details of portions of the assembly.

It then is desirable to hold the plug 50 or 60 in place. This can be done in a variety of ways, including utilization of threaded fasteners, cotter pins, and the like. FIGS. 5, 6 and 7 illustrate one manner in which this can be accomplished. The embodiment of FIG. 2 is illustrated in conjunction with FIGS. 5, 6 and 7, and shows the plug 60 with the skid plate 62 attached to its lower end. On the side opposite the guide channels 64, 66 (or for the plug 50, the channels 54, 56) is located a short vertical spring member 70 with a pair of semi-spherical projections 72 located on it.

The distance between the projections 72 is equal to the internal distance of the entry hole sets 18, 20 or 22, 24 in the housing portion 16; so that when the arcuate guide slots or channels 64, 66 (or 54, 56) are aligned in accordance with the cross-sectional orientation shown in FIG. 4, the projections 72 enter into the unused or opposing sets of entry holes. For example, if the entry holes 22 and 24 are being utilized, as illustrated in FIGS. 3 and 4, the projections 72 extend into the entry holes 18 and 20, as illustrated in FIG. 7, to hold the insert 60 in place against both axial movement and rotational movement. FIG. 7 is a partial cross-sectional view of the main housing portions 10/12/14/16 illustrating the alignment of the various parts of the plug insert 60 when the slots 64 and 66 are aligned with the entry holes 22 and 24 in the manner described previously in conjunction with FIGS. 3 and 4.

Obviously, other techniques may be used to hold the insert plug 50 or 60 in place; and the one illustrated in FIGS. 5, 6 and 7 is merely shown as one of a number of possibilities. An advantage to the embodiment shown in FIGS. 5, 6 and 7 is that the spring member 70 and the projections 72 serve to align the corresponding slots or channels 54/56 or 64/66 to properly align the slots with the desired entry hole pair to form the guide path described previously between the entry holes and the exit openings of the device.

It also should be noted that while a single line segment is illustrated with the exit openings located on diametrically opposite sides of the central axis of the main housing member, it is possible to provide additional sets of entry holes and additional exit openings; so that a pair of line segments 40 may be used with four different exit holes located, for example, at 90° intervals around the periphery of the portion 12 of the main housing. The arcuate paths, such as the paths 54/56, necessarily would be of a smaller radius than when the configuration illustrated in conjunction with FIGS. 3 and 4 is used; but the overall manner of operation of the insert plug to facilitate the insertion of line segments would be the same for such a modified configuration.

As shown in FIG. 4, the use of flared exit openings 34 and 36 permits the segment of the line 40 extending outwardly through these openings to flex without bending the line at a sharp angle during operation of the string trimmer machine with which the trimmer head is used, and during impact of the extensions of the line 40 with grass and brush which is being cut. This further reduces the likelihood of sharp bends occurring which would otherwise tend to break off the line segments if the flared guides 34 and 36 were not provided. If desired, the main housing could also be made of high impact plastic material with metal sleeves in all of the entry holes and exit openings.

The foregoing description of the preferred embodiment of the invention is to be considered as illustrative and not as limiting. Various modifications will occur to those skilled in the art for performing substantially the same function, in substantially the same way, to achieve substantially the same result without departing from the true scope of the invention as defined in the appended claims.

What is claimed is:

1. A trimmer head for string trimmer machines utilizing fixed length segments of line including in combination:
    a generally cylindrically shaped hollow main housing having a central axis and configured at a first end for attachment to the drive shaft of a string trimmer machine and open at a second end thereof;

first and second line entry holes through the main housing member and spaced apart a first predetermined distance in a plane intersecting the central axis of the main housing;

first and second line exit openings through the main housing and spaced apart a second predetermined distance in a plane intersecting the central axis of the main housing, with the second predetermined distance being greater than the first predetermined distance; and an insert member located in the hollow main housing with a first guide channel between the first entry hole and the first exit opening and a second guide channel between the second entry hole and the second exit opening.

2. The trimmer head according to claim 1 wherein the first and second guide channels are arcuate guide channels.

3. A trimmer head according to claim 2 wherein the first and second line entry holes are formed along corresponding radii of the hollow main housing member.

4. A trimmer head according to claim 3 wherein at least the string entry holes and the string exit openings are made of metal.

5. A trimmer head according to claim 4 wherein the hollow main housing member is metal and the insert member is non-metallic.

6. A trimmer head according to claim 5 further including third and fourth line entry holes through the housing in the same plane as the first and second line entry holes, the third and fourth line entry holes being located on the hollow main housing diametrically opposite the first and second line entry holes and being spaced apart at the first predetermined distance, the third and fourth line entry holes each being larger than the first and second line entry holes.

7. A trimmer head according to claim 6 wherein the third and fourth line entry holes are radially formed through the hollow main housing.

8. A trimmer head according to claim 7 wherein the insert member is a substantially cylindrically shaped member and wherein the first and second guide channels are open at the outer surface of the cylindrical member and extend into the interior thereof.

9. A trimmer head according to claim 8 further including means for releaseably attaching the insert member in the hollow main housing.

10. A trimmer head according to claim 9 wherein the first and second line exit openings comprise circular openings of a first predetermined diameter and the width of each of the first and second guide channels is equal to or less than the diameter of the first and second exit openings.

11. A trimmer head according to claim 10 wherein the plane in which the first and second line entry holes are located is a first plane perpendicular to the central axis of the main housing and the plane in which the first and second line exit openings are located is a second plane perpendicular to the central axis of the main housing.

12. A trimmer head according to claim 11 wherein the plane in which the first and second line entry holes are located is perpendicular to the central axis of the main housing; and the plane in which the first and second line exit openings are located is spaced a predetermined distance from the plane in which the first and second line entry holes are located and is parallel to the plane in which the first and second line entry holes are located.

13. A trimmer head according to claim 12 wherein the outside diameter of the main housing is approximately 2" and the first predetermined distance is approximately 1".

14. A trimmer head according to claim 1 wherein the first and second line entry holes are circular holes with a first predetermined diameter, the first and second line exit openings are circular openings with a second predetermined diameter equal to or greater than the first predetermined diameter, and the first and second guide channels in the insert member each have a width equal to or less than the diameter of the first and second line exit openings.

15. A trimmer head according to claim 14 further including third and fourth line entry holes through the housing in the same plane as the first and second line entry holes, the third and fourth line entry holes being located on the hollow main housing diametrically opposite the first and second line entry holes and being spaced apart at the first predetermined distance, the third and fourth line entry holes each being larger than the first and second line entry holes.

16. A trimmer head according to claim 15 further including means for releaseably attaching the insert member in the hollow main housing.

17. A trimmer head according to claim 1 wherein the plane in which the first and second line entry holes are located is a first plane perpendicular to the central axis of the main housing and the plane in which the first and second line exit openings are located in a second plane perpendicular to the central axis of the main housing.

18. A trimmer head according to claim 1 wherein the first and second line exit openings comprise circular openings of a first predetermined diameter and the width of each of the first and second guide channels is equal to or less than the diameter of the first and second exit openings.

19. A trimmer head according to claim 1 wherein the first and second line entry holes are formed along corresponding radii of the hollow main housing member.

20. A trimmer head according to claim 19 further including third and fourth line entry holes through the housing in the same plane as the first and second line entry holes, the third and fourth line entry holes being located on the hollow main housing diametrically opposite the first and second line entry holes and being spaced apart at the first predetermined distance, the third and fourth line entry holes each being larger than the first and second line entry holes.

21. A trimmer head according to claim 20 wherein the third and fourth line entry holes are radially formed through the hollow main housing.

22. A trimmer head according to claim 1 wherein the plane in which the first and second line entry holes are located is perpendicular to the central axis of the main housing; and the plane in which the first and second line exit openings are located is spaced a predetermined distance from the plane in which the first and second line entry holes are located and is parallel to the plane in which the first and second line entry holes are located.

23. A trimmer head according to claim 2 wherein the insert member is a substantially cylindrically shaped member and wherein the first and second guide channels are open at the outer surface of the cylindrical member and extend into the interior thereof.

24. A trimmer head according to claim 1 wherein the insert member has a portion extending beyond the second end of the main housing when the insert member is located in the main housing with the portion extending beyond the second end of the main housing comprising a skid plate for the trimmer head.

25. A trimmer head according to claim 1 wherein at least the string entry holes and the string exit openings are made of metal.

* * * * *